US012373846B2

United States Patent
Donthi et al.

(10) Patent No.: US 12,373,846 B2
(45) Date of Patent: *Jul. 29, 2025

(54) COMPUTER-BASED SYSTEMS CONFIGURED FOR POST-INTERACTION DATA PROVISIONING AND METHODS OF USE THEREOF

(71) Applicant: Capital One Services, LLC, McLean, VA (US)

(72) Inventors: Abhay Donthi, Cary, NC (US); Michael Mossoba, Great Falls, VA (US); Asher Smith-Rose, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/623,892

(22) Filed: Apr. 1, 2024

(65) Prior Publication Data
US 2024/0265401 A1   Aug. 8, 2024

Related U.S. Application Data

(63) Continuation of application No. 17/388,536, filed on Jul. 29, 2021, now Pat. No. 11,948,154.

(51) Int. Cl.
*G06Q 30/016* (2023.01)
*G06N 20/00* (2019.01)

(52) U.S. Cl.
CPC ......... *G06Q 30/016* (2013.01); *G06N 20/00* (2019.01)

(58) Field of Classification Search
None
See application file for complete search history.

(56) References Cited

U.S. PATENT DOCUMENTS 8,392,261 B2   3/2013 Lee et al.
9,934,495 B2   4/2018 Novick et al.
(Continued)

OTHER PUBLICATIONS

Wagner, Michal, "Machine Learning in a Digital Age: The Future is Now," Appsflyer.com [online], available at: https://www.appsflyer.com/blog/mobile-marketing/machine-learning-digital-marketing/ published on Feb. 16, 2021.*

(Continued)

*Primary Examiner* — Richard W. Crandall
(74) *Attorney, Agent, or Firm* — Greenberg Traurig, LLP

(57) ABSTRACT

Systems and methods of provisioning post-interaction values are disclosed. In one embodiment, an exemplary computer-implemented method may comprise: receiving an interaction session message from a computing terminal, the interaction session message comprising an identifying data of a personal transacting device; defining, based on an interaction session: i) a user-specific context parameter about the user, and ii) a location-specific context parameter about a physical location of the computing terminal; defining post-interaction values based on the user-specific context parameter and the location-specific context parameter; sending the post-interaction values to the computing terminal; instructing the computing terminal to transmit the post-interaction values to the circuitry of the personal transacting device; and sending an instruction to a computing device associated with the user to establish a second session between the personal transacting device and the computing device and transfer the post-interaction values to the computing device.

19 Claims, 10 Drawing Sheets

(56) References Cited

U.S. PATENT DOCUMENTS

| | | | |
|---|---|---|---|
| 10,430,798 | B2 | 10/2019 | Volpi |
| 10,592,882 | B1* | 3/2020 | Viswanath ......... G06Q 30/0268 |
| 11,494,782 | B1* | 11/2022 | Jacoby ................. G06Q 20/351 |
| 2003/0004743 | A1* | 1/2003 | Callegari ................ G06F 16/29 |
| | | | 705/1.1 |
| 2007/0264991 | A1 | 11/2007 | Jones et al. |
| 2014/0108124 | A1 | 4/2014 | Bous et al. |
| 2015/0254698 | A1* | 9/2015 | Bondesen .............. G06Q 20/36 |
| | | | 705/14.17 |
| 2016/0358214 | A1* | 12/2016 | Shalunov ........... G06Q 30/0639 |

OTHER PUBLICATIONS

Midura, Danine, "Leveraging Machine Learning Using CRM Data," [online], published on Jul. 14, 2021, available at: < https://www.techadv.com/blog/leveraging-machine-learning-using-crm-data > (Year: 2021).*

Vrabie, "How Machine Learning Will Shape the Ecommerce Industry," Disruptive [online], published on May 10, 2019, available at: < https://disruptiveadvertising.com/ppc/ecommerce/machine-learning-ecommerce/ > (Year: 2019).

* cited by examiner

COMPUTER-BASED SYSTEMS CONFIGURED FOR POST-INTERACTION DATA PROVISIONING AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-implemented methods, improved computer-based platforms or systems, improved computing components and devices configured for one or more novel technological applications involving providing post-interaction data and/or services-related features configured for various functionality such as determining contextual information, determining post-interaction data and/or service items, establishing machine learning trained model, communicating post-interaction data and/or service items in certain instances and/or performing other features.

BACKGROUND OF TECHNOLOGY

A computer network platform/system may include a group of computers (e.g., clients, servers, computing clusters, cloud resources, etc.) and other computing hardware devices that are linked and communicate via software architecture, communication applications, and/or software applications associated with electronic transactions, data processing, and/or service management involved with payment transactions, and/or associated post-interaction activities/data and/or services.

SUMMARY OF DESCRIBED SUBJECT MATTER

In some embodiments, the present disclosure provides various exemplary technically improved computer-implemented methods involving provisions of post-interaction data and services associated with personal transacting device based interaction sessions (e.g., a smart transaction card based payment transactions, etc.), the method comprising steps such as:
receiving, by a server, an interaction session message from a computing terminal, wherein the interaction session message is related to a first session between the computing terminal and a circuitry of a personal transacting device of a user, the interaction session message comprising an identifying data of the personal transacting device;
defining, by the server, based on the first session:
i) a user-specific context parameter about the user, and
ii) a location-specific context parameter about a physical location of the computing terminal;
defining, by the server, one or more post-interaction values based on the user-specific context parameter and the location-specific context parameter;
sending, by the server, the one or more post-interaction values to the computing terminal;
instructing, by the server, the computing terminal to transmit the one or more post-interaction values to the circuitry of the personal transacting device; and
sending, by the server, an instruction to a computing device associated with the user to instruct the user to position the personal transacting device in a specific arrangement with the computing device so as to enable the circuitry of the personal transacting device to establish a second session between the personal transacting device and the computing device and transfer the one or more post-interaction values to the computing device.

In some embodiments, the present disclosure provides various exemplary technically improved computer-implemented methods involving provisions of post-interaction data and services associated with payment transactions via crowdsourcing, the method comprising steps such as:
receiving, by a server, an interaction session message from a computing terminal, wherein the interaction session message is related to a first session between the computing terminal and a circuitry of a personal transacting device of a user, the interaction session message comprising an identifying data of the personal transacting device;
defining, by the server, based on the first session:
i) a user-specific context parameter about the user, and
ii) a location-specific context parameter about a physical location of the computing terminal;
defining, by the server, one or more post-interaction values based on the user-specific context parameter and the location-specific context parameter;
determining, by the server, whether the defined one or more post-interaction values are available for transmission to the user; and
transmitting, by the server and responsive to determining that the one or more post-interaction values are not available for transmission to the user, a notification to a computing device associated with the user, wherein the notification includes a crowdsourcing app and a security token, and the notification notifies the user to obtain the one or more post-interaction values via the crowdsourcing app by activating the crowdsourcing app with the security token.

In some embodiments, the present disclosure also provides exemplary technically improved computer-based systems, and computer-readable media, including computer-readable media implemented with and/or involving one or more software applications, whether resident on personal transacting devices, computer devices or platforms, provided for download via a server and/or executed in connection with at least one network and/or connection, that include or involve features, functionality, computing components and/or steps consistent with those set forth herein.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
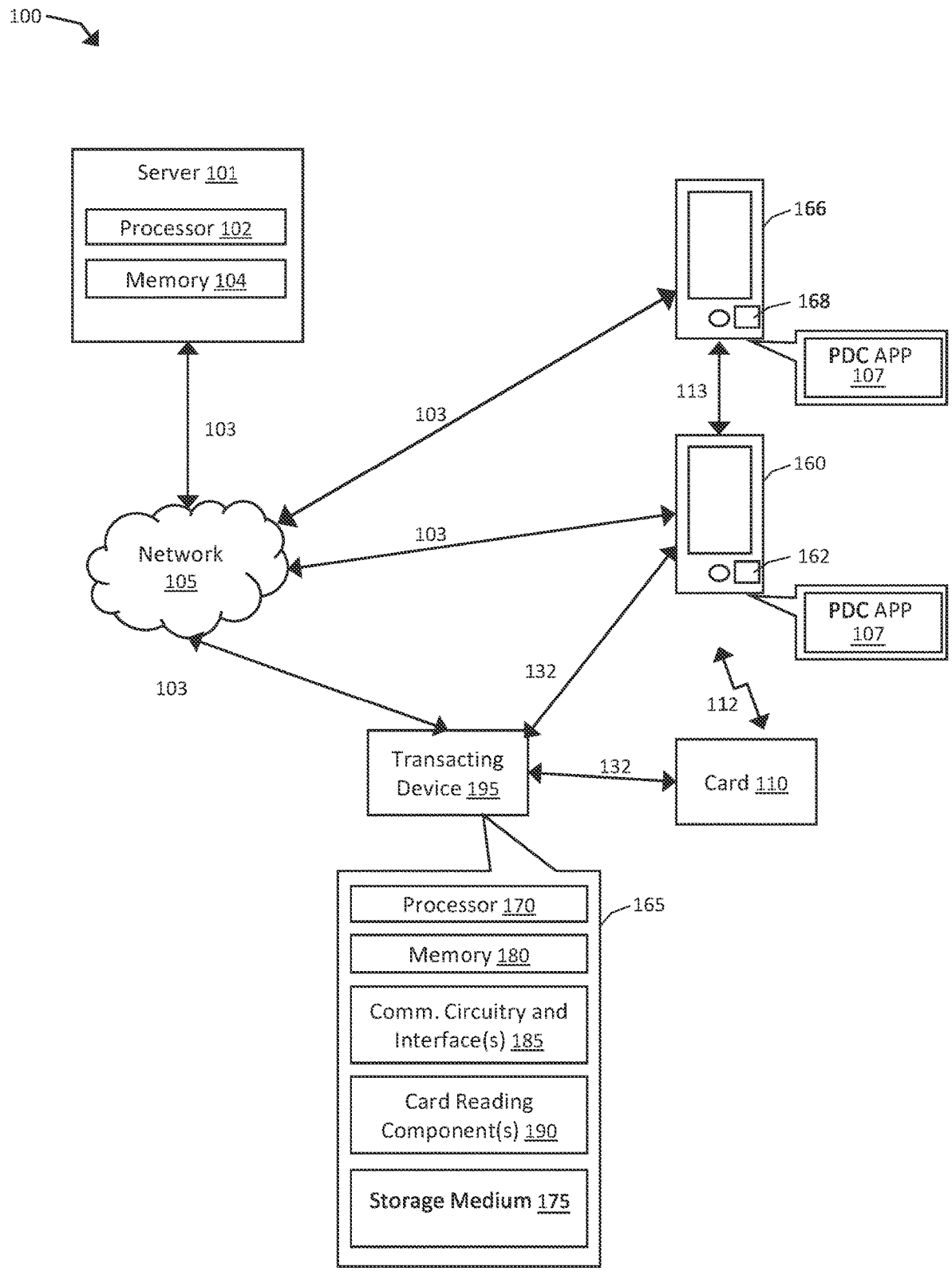
FIG. 1 is a block diagram of an exemplary system and/or platform illustrating aspects of providing post-interaction data based on payment transactions, consistent with exemplary aspects of certain embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

As explained in more detail, below, various exemplary computer-based systems and methods of the present disclosure allow for improved provisioning of post-interaction data and/or features associated with such as, but not limited to, personal transacting devices, such as, smart transaction cards, interacting with transacting terminals (e.g., computing terminals) such as point of sale or service (POS) devices. In one embodiment, an exemplary computer-implemented method of the present disclosure may include detecting a transaction based on a smart transaction card by a user, determining one or more post-interaction data items for the user based on context information, transmitting the one or more post-interaction data items to the smart transaction card, and notifying the user at a mobile device such that the user is instructed to interact the smart transaction card with the mobile device to allow the transferal of the one or more post-interaction data items.

As used herein, post-interaction values refer to data relating to both information and services, as well as data relating to one or more sources from which such information and services may be retrieved or otherwise accessed, and/or authentication data based on which such information and services may be retrieved or otherwise accessed. Post-interaction values may include one or more information items, one or more service items, one or more source items, one or more authentication items, or any combinations thereof. Non-limiting examples of such post-interaction data include facility access information, a coupon, a survey, a return policy, a security token, an address to download an application, an application, an appointment-booking program, a reminder, a return-reminder based on detection that a purchased product has not been returned, an on-site navigation map, an on-site reservation program, a customer loyalty reward program, a curbside pickup guide program, and any other type of information and services that are germane to payment transactions of users at various POS devices, or any other types of payment processing devices. In some implementations, the post-interaction values may comprise post-transaction values.

Various embodiments disclosed herein may be implemented in connection with one or more entities that provide, maintain, manage, or otherwise offer any services relating to payment transaction systems. In some embodiments, the exemplary entity may be a financial service entity that provides, maintains, manages, or otherwise offers financial services. Such financial service entity may be a bank, credit card issuer, or any other type of financial service entity that generates, provides, manages, and/or maintains financial service accounts that entail providing a smart transaction card to one or more customers, the smart transaction card configured for use at a transacting terminal to access an associated financial service account. Financial service accounts may include, for example, credit card accounts, bank accounts such as checking and/or savings accounts, reward or loyalty program accounts, debit account, and/or any other type of financial service account known to those skilled in the art.

FIG. 1 depicts an exemplary computer-based system 100 illustrating aspects of improved provisioning of post-interaction data associated with the use of a smart transaction card and a wireless device (e.g., a computing device, etc.) at computing terminals such as POS devices, in accordance with one or more embodiments of the present disclosure. System 100 may include at least one server 101, at least one wireless device 160, at least one smart transaction card 110, and at least one computing terminal 195, which may all communicate 103 over at least one communication network 105. Computing terminal 195 may be a POS (point-of-sale, point-of-service, etc.) device, or other terminal or computer that processes transactions authorized via the transaction card 110 and/or the wireless device 160, as explained above. To attract more transactions at computing terminal 195 and render more satisfactory user experience, the business or merchant associated with the computing terminal 195 and typically a financial institution, such as a credit card company that has issued the smart transaction card 110 to the user, have incentive and desire to enhance the computing terminal 195 to provide a variety of post-interaction data via interaction(s) with the computing terminal 195. Embodiments herein relate to systems and methods whereby computing terminals 195 can communicate 132 with wireless devices of users, and/or smart transaction cards 110 of the users, based at least in part upon receiving a payment request from the user via the wireless device 160, and/or the smart transaction card 110. Here, for example, embodiments herein may also leverage the fact that the user may perform payment transactions by use of a variety of payment methods, including, for example, a smart transaction card, a conventional transaction card, a digital wallet service, a mobile pay service, a cryptocurrency (e.g., bitcoin, cryptocurrency, virtual tokens, etc.) based payment service, an online payment service, and so on.

The exemplary system of FIG. 1 may include an exemplary mobile device 166 (or any other computing device not shown herein), associated with at least one other user who is not the owner of the smart transaction card 110. In some embodiments, the mobile device 166 may be associated with another user who has transacted with the computing terminal 195 before and as a result of which the mobile device 166 has already stored or otherwise have access to at least a portion of the post-interaction data the computing terminal 195 is configured to transmit to the mobile device 160 of the user. In some embodiments, in the scenarios where the computing terminal 195 pushes post-interaction data pertinent to not only the merchant operating the computing terminal 195 and the merchant's store/services, but also the general aspects about, for example, the community of the merchant (e.g., the strip mall, block, neighborhood in which the merchant's store is located, etc.), other merchants and/or services nearby, the mobile device 166 may be a user who has transacted with other computing terminals or entities but nevertheless possesses or has access to at least a portion of the post-interaction data shared in the community. In various embodiments, the mobile device 166 may provide the requested post-interaction data directly to the requesting device, or upload to a crowdsourcing server for relaying to the requesting device. In some embodiments, the exemplary mobile device 166 may be in communication 113 with the mobile device 160.

As shown in FIG. 1, the mobile device 166 may include mobile device circuitry 168. Mobile device circuitry 168 may include a mobile device processor, memory such as RAM, computer-readable media, communication circuitry and interface, and/or any input and/or output device, such as a touchscreen display. The memory may store code that, when executed by processor, may cause processor to implement one or more aspects of various crowdsourcing functionalities described herein above.

In some embodiments, the mobile device 166 may be configured to execute, among other programs, a crowdsourcing application. In some embodiments, such a crowdsourcing application may be included as part of a post-interaction data concierge (PDC) application 107. In some embodiments, exemplary PDC application 107 may be one or more software applications configured to perform operations consistent with providing an app, e.g., for mobile devices 160 and 166, and/or a portal, e.g., via web pages, to the user, for accessing and interacting with the post-interaction data associated with one or more payment transactions and managing various other aspects of the post-interaction data. In other embodiments, the post-interaction data may be accessed without a specialized application such as the PDC application 107. For instance, the post-interaction data may be displayed in a text message, communicated to (e.g., via Bluetooth, Wi-Fi, cellular, other shared or pairing services or protocols, etc.) a memo application, photo application, notification center, email, social media page, phone call or otherwise transmitted or accessed, such as via the invocation of the downloading of an appropriate application, as appropriate. In some embodiments, the post-interaction data may be transferred onto the mobile device 166 and 160 without being displayed to the user. For example, a Wi-Fi code as the post-interaction data delivered to the mobile device may be configured to be directly supplied to the network setting without rendered for display to the user, with or without the PDC application intercepting the Wi-Fi code.

The exemplary PDC application 107 may provide various functionalities associated with provisioning post-interaction data at the wireless devices 160 and 166, as well as functionality involved with the smart transaction card based features related to the provisioning of post-interaction data herein, such as those described below in connection with FIG. 2. In some embodiments, the PDC application may be further configured to enable the mobile devices of the respective users to participate in crowdsourcing post-interaction data. For example, when it is determined that one or more post-interaction data items are not available (e.g., due to various factors such as server down, network down, database faults, or the business decision not to incur costs to host such post-interaction data for provisioning, etc.) for transmitting to the mobile device 160, crowdsourcing such post-interaction data items may be instigated instead. As illustrated in FIG. 1, only one other peer mobile device 166 is depicted to crowdsource post-interaction data to mobile device 160, and it should be understood that any number of other computing devices having access to the requested post-interaction data items may partake in crowdsourcing aspect via the PDC application. In some embodiments, these other computing devices may also, in addition to or independently, utilize an application that is not specific to the post-interaction data provision paradigm to crowdsource the requested post-interaction data to the mobile device 160, as long as the partaking computing device has access to the requested data. According to certain implementations, other apps of peer-to-peer sharing functionality that are not "crowdsourcing" may also be utilized to achieve such functionality and/or results. In some embodiments, the computing terminal may instigate crowdsourcing for one or more post-interaction items, which are in turn transmitted either directly from the mobile device 166 or a crowdsourcing server (not shown) to the mobile device 160, or stored at a data store associated with the computing terminal 195 for transmitting to the smart transaction card 110 first, and/or the mobile device 160 alternatively.

In some embodiments, server(s) 101 may be associated with one or more entities that are stakeholders to interaction sessions and/or card transactions at the computing terminal 195, such as the business or merchant, one or more financial services providers, such as an issuer of a credit card, debit card, or other transaction card associated with the attempted payment transaction.

In the embodiment shown in FIG. 1, an illustrative computing terminal 195 may comprise: one or more processors 170 and/or computer readable media 175, memory 180, communication circuitry and/or interfaces 185, and at least one card reading component 190. Such card reading component(s) 190 may be configured to read information from the smart transaction card 110; for example, at least one card reading component may be comprised of one or more magnetic stripe reader, a chip reader, and/or a first near field communication (NFC) component. Communication circuitry and/or interfaces 185 may comprise at least one wireless device transceiver component configured to communicate, at any time before, during and/or after execution of a payment transaction, with a mobile device 160 presented for access, where the mobile device transceiver component may comprise a second NFC component. In some embodiments, the computing terminal 195 may further comprise one or more cameras (not shown), and/or one or more biometric sensors (not shown) for user interactions. In various embodiments, the computing terminal 195 is associated with a physical location, e.g., a merchant's physical store, or other such locations.

In some embodiments, exemplary processors 170 and/or computer readable media 175 may be configured to execute instructions associated with performing methods such as that described below in more detail in connection with FIGS. 4A-4B and elsewhere herein. For instance, the computing terminal may be configured to determine the contextual information associated with the transaction for processing, determine the post-interaction data associated with the particular transaction based on the contextual information using a recommendation engine equipped with AI models, prior to communicating with the smart transaction card and/or mobile device 160 to provision the post-interaction values.

Still referring to FIG. 1, server 101 may include at least one processor 102, and a memory 104, such as random-access memory (RAM). In some embodiments, server 101 may be operated by the entity issuing the smart transaction card, by the merchant, and/or by any transaction processing entity involved with authorizing the smart transaction card for use.

In some embodiments, the smart transaction card 110 may be, without limitation, a traditional credit card, debit card, gift card, royalty card, a smart transaction card such as a dynamic transaction card (e.g., a card detailed in U.S. Pat. No. 10,402,818 B2 assigned to Capital One Service LLC), RFID card, and/or any of a variety of other similarly suitable chip card. In some embodiments, the smart transaction card 110 may be formed from plastic, metal, or any other suitable material. Smart transaction card 110 may include card circuitry formed directly therein, and/or disposed therein by gluing, bonding or by any suitable adhesion method for affixing circuitry to the material of smart transaction card 110. Card circuitry may be configured to utilize any hardwired circuitry. Card circuitry may be implemented as one or more integrated circuit chips, and/or electronic devices, electrically interconnected and bonded to one or more circuit boards, for example. In some embodiments, the smart transaction card 110 may be a contactless card including a chip or any type of smart chip (e.g., a presto chip, etc.).

Mobile device 160, such as a smart phone or other portable or wireless or wearable electronic device, may include mobile device circuitry 162. Mobile device circuitry 162 may include a mobile device processor, memory such as RAM, computer-readable media, communication circuitry and interface, and/or any input and/or output device, such as a touchscreen display. The memory may store code (e.g., such as the PDC application 107, etc.) that, when executed by the processor, may cause the processor to implement one or more aspects of various post-interaction data related schemes herein, including those involving at least one of: (1) receiving notification from the computing terminal 195, (2) receiving data from the smart transaction card 110, (3) instigate crowdsourcing of one or more post-interaction data items, (4) receiving crowdsourced one or more post-interaction data items, and/or (5) activating and/or authenticating the smart transaction card for communicating post-interaction data and/or related information with the computing terminal 195 and/or the mobile device 160. Mobile device 160 may also display various graphical user interfaces that a card owner may utilize to implement, configure and/or manage post-interaction data provisioning features herein. In some embodiments, an application running on mobile device 160, such as an application supplied by the entity issuing the smart transaction card and/or managing the transactions of the smart transaction card owner, may include various modules that may transmit information to the computing terminal, relay information back to the entity (e.g., server 101), and/or communicate with other computing components.

Various embodiments associated with FIG. 1 and related disclosure herein solve a technical problem of augmenting computing terminals with improved ability to provision post-interaction data via smart transaction cards and/or wireless devices of users in a more secure, and/or efficient (e.g., computation resource efficient, etc.) manner. Various embodiments are implemented based on features and functionality including determining pertinent context information associated with the payment transaction, determining one or more post-interaction data based on the context information, securely transferring/providing the post-interaction data only to desired/intended users (e.g., via such the smart transaction card, etc.), as well as various mobile device based solutions that include features and functionality for receiving notifications/tokens from the computing terminal, receiving post-interaction data from the smart transaction card, requesting crowdsourcing of and/or receiving crowdsourced post-interaction data. Various features and functionality disclosed herein may also be utilized in connection with improving computing terminal functionalities that involve an AI-assisted post-interaction data recommendation engine, communication between computing terminal 195 and mobile device 160 with less security concerns, communication between computing terminal 195 and mobile device 160 leveraging secure data transfer via a smart transaction card, while executing a software application on the mobile device 160 for accessing, interacting with, requesting, and providing the post-interaction data. In other embodiments, various information gathered via the mobile device 160 and/or the device or card owner may be relayed back to server 101 (e.g., server processor 102) so as to perform more detailed context detection, post-interaction data recommendation, crowdsourcing, such as to provision post-interaction data at the mobile device of the user.

In some embodiments, the mobile device 160 may be configured to be in communication 112 with the smart transaction card 110. In implementations, an initial authentication for pairing the smart transaction card with the mobile device may be implemented by the user contacting the entity from the user's mobile device to initially authorize the pairing of smart transaction card 110 with mobile device 160 so as to receive pairing approval. In other embodiments, the pairing and/or unpair processes between the smart transaction card and the mobile device may occur automatically and seamlessly such as without any action on the part of the user, particularly if the same mobile device had been previously paired with the same smart transaction card in the past. In yet other embodiments, proximity MFA may use biometrics (e.g., fingerprint, voice recognition, etc.) and/or a password entered by the user and/or a swiping of the mobile device screen by a finger of the user and/or the proximity of the smart transaction card to the mobile device or any client device and/or tapping/coupling the device, e.g., via NFC connection or pairing, etc., for example, to pair or unpair the smart transaction card with the mobile device or client. In some embodiments, increased security and/or efficiencies in the provision of the post-interaction data may be achieved via use of such paired smart transaction card 110 and mobile device 160.

While only one server 101, computing device 109, network 105, computing terminal 195, mobile device 160, mobile device 166, and smart transaction card 110 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments. Computing device 109 may be one or more computing devices configured to perform operations consistent with executing card management application 107.

Figure 2:
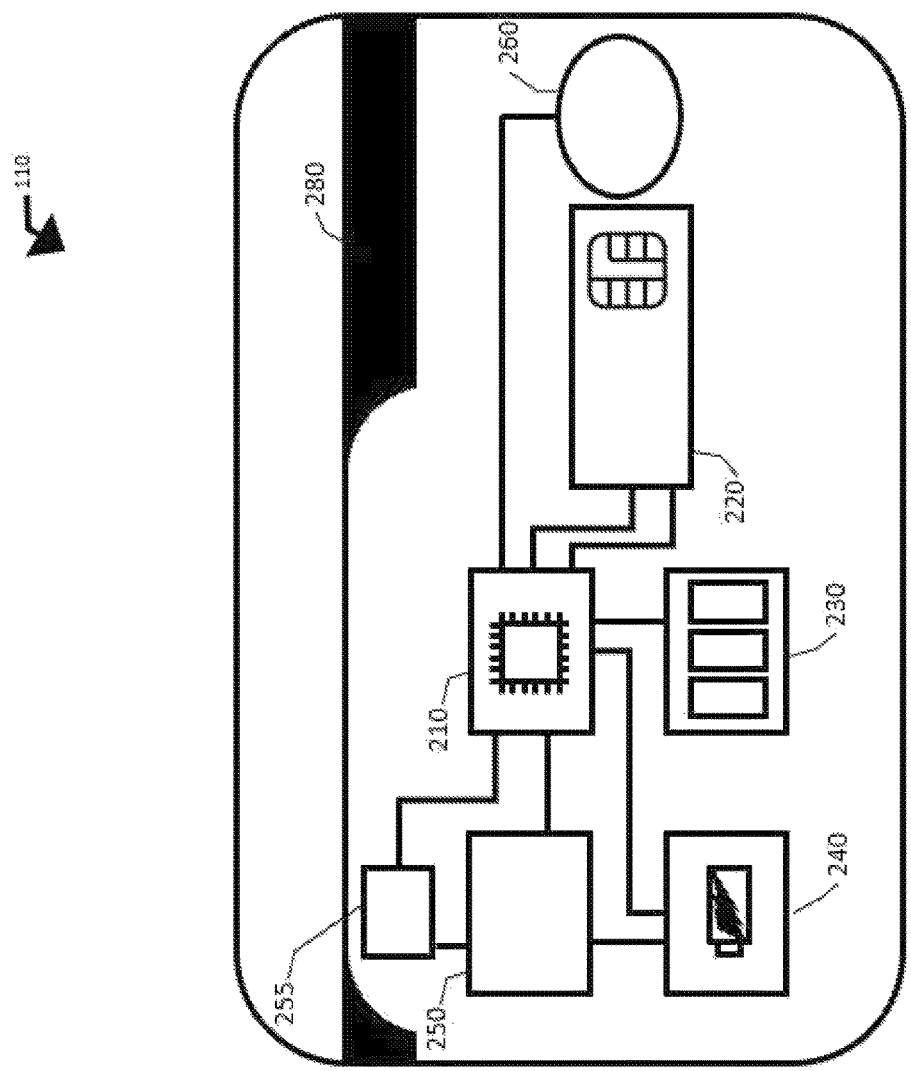
FIG. 2 is a block diagram illustrating an exemplary smart transaction card, which may be related to providing post-interaction data associated with payment transactions, consistent with exemplary aspects of certain embodiments of the present disclosure.

FIG. 2 is a diagram illustrating an exemplary simplified smart transaction card related to the provisioning of post-interaction data, consistent with exemplary aspects of certain embodiments of the present disclosure. In some embodiments, smart transaction card 110 may be the approximate size and shape of a traditional credit card, debit card, or the like. Smart transaction card 110 may be a smart transaction card having embedded electronics for performing various aspects of the disclosed innovations. As shown, smart transaction card 110 may include at least one processor 210 or processing circuitry, memory 230, power source or power circuitry 240, fingerprint input elements and/or circuitry 260, one or more other sensors 250, communication circuitry/devices 255, a magnetic stripe 280, and other coupling circuitry 220 such as an electronic chip element and associated interconnects. Power source or power circuitry 240 may include elements that generate power for the card upon coupling to a POS device, such as by connection via an electronic chip, and/or such circuitry may include a voltage supply such as a battery. In some embodiments, smart transaction card 110 may include more or fewer components than shown in FIG. 2.

Processor 210 may comprise one or more known or specialized processing devices, of sufficient size and form factor to fit within smart transaction card 110 when configured to be about the size of a traditional credit or debit card. In some embodiments, processor 210 may include any configuration capable of performing functions related to the disclosed methods such as, for example, generating and transmitting the payment request including the smart transaction card information, receiving information and/or instructions from the computing terminal for storage and/or execution on the smart transaction card, transmitting information to the wireless device 160, among other functionalities and feature. In some embodiments, one or more of those card-based processing and communication may be authenticated by information relating to the validation of the fingerprint verification associated with usage of the smart transaction card 110, which may be based on the various fingerprint inputs generated by the smart transaction card 110. In some embodiments, one or more of those card-based processing and communication may be authenticated by an indication relating to the validation of the presence of the wireless device 160 (or other mobile devices or wearable devices of the user) being in the vicinity to the smart transaction card 110, based on technologies such as, Bluetooth enabled pairing or proximity sensors, etc.

Processor 210 may also control power source 240, send and receive data, read from and written to memory 230, receive and analyze data from sensors 250, process information or instructions associated with the coupling circuitry 220, receive and process input from the fingerprint input elements and/or circuitry 260, and any other functions consistent with the disclosed embodiments.

Memory 230 may include volatile or non-volatile, magnetic, semiconductor, or other type of storage elements and/or tangible (i.e., non-transitory) computer-readable medium that stores relevant instructions and data, such as information needed for or associated with conducting card transactions, as well as receiving, storing, executing, retrieving and transmitting data and/or instructions related to post-interaction data for communication to the wireless devices 160 and 166. In some embodiments, the operations may comprise receiving, when a payment transaction is successfully processed at the computing terminal 195, or by an online entity, information related to the particular instance of transaction (e.g., post-interaction data) at the computing terminal 195 or the online entity by the communication circuitry 255. The operations may also comprise transmitting, when the card 110 is positioned in a particular arrangement with respect to the wireless device 160 of the user, post-interaction data to the wireless device 160 of the user. In one example, the post-interaction data is transmitted by the smart transaction card 110 to one or more of: a wireless computing device, a server, and/or a mobile device associated with the card user.

With regard to the aspect of a fingerprint validation result generated by the card 110, such instructions, when executed by the processor 210, cause the card 110 to perform operations associated with fingerprint based card activation and/or other operations and communications. In some embodiments, the operations may comprise transmitting, when a purchase transaction is attempted to the computing terminal 195, or an online entity, information related to the validation of the fingerprint verification to the computing terminal 195 or the online entity by the communication circuitry 255. In one example, the information related to the validation of the fingerprint verification is transmitted to one or more of: a wireless computing device, a server, and/or a mobile device associated with the card user. In another example, the information related to the validation of the fingerprint verification is transmitted to one or both of: (i) the computing terminal 195 and/or at least one merchant computer associated with the online entity, and (ii) the server associated with the provider of the smart transaction card 110, to authorize the transaction attempt.

In some embodiments, the operations may be further configured to: (i) activate the card, when the card 110 enters a proximal engagement with a point of sale terminal or a mobile device associated with the card user (e.g., via tap, NFC, Bluetooth, etc.), from a sleep mode in which a transaction capability is disabled; (ii) activate, upon verifying that the detected fingerprints are valid, the card 110 for the purposes of completing transactions; and/or (iii) transmit the transaction by a suitable communication medium (e.g., NFC, RFID, Narrow Band Internet of Things (NBIOT), WiFi, WiMax, ZigBee, Bluetooth, etc.).

In other embodiments, the instructions may comprise an applet comprising instructions for operations of receiving, storing, processing, retrieving, and/or transmitting post-interaction data by the card 110 and requiring one or more of: i) an additional confirmation action; and/or ii) additional communication with an application on the mobile device 160 associated with the card user. Here, for example, the additional confirmation action may include a supplemental communication with the user to confirm that he or she is interested in access to the post-interaction data, such as via text, phone call, etc., supplemental action performed via the computing terminal, and/or other communications to a user that enable the user to reply with an electronic communication to confirm such interest, such as a communication to any laptop, mobile or wearable device selected by the user. The additional communication with an application (e.g., post-interaction data app 107) on the user's mobile device 160 may include, for example, authorizing the computing terminal 195 to write to the card 110, activating the card for receiving data from the authorized computing terminal 195, activating the card 110 for transmitting data to the wireless device 160, responding to a prompt within the application requesting confirmation of the interest in access to post-interaction data associated with the particular payment transaction, or simply requiring the user to successfully log into an app, such as an online app, mobile app, or the like.

According to various embodiments, the operations may further comprise one or both of: (i) informing a computing terminal, at which the transaction is submitted, whether or not the card 110 is authorized to participate in the provisioning of the post-interaction data to the wireless device of the user; and/or (ii) instructing a computing terminal to communicate by the Bluetooth communications with an application (e.g., post-interaction data app 107) on a mobile device associated with the card user regarding the performance of additional processing associated with the provisioning of post-interaction data.

Power source 240 may include a power storage device such as a battery or capacitor, a power receiver such as an inductive power coil or a wireless power receiver, a power generator such as a solar or kinetic power generator, or any combination thereof. In some embodiments, power source 240 may include one or more other known devices capable of generating, receiving, and/or storing electrical energy.

In some embodiments, one or more sensors 250 may include one or more devices capable of sensing the environment around smart transaction card 110, movement of the smart transaction card 110, and/or other detectable interactions involving the smart transaction card 110. In some embodiments, such sensors 250 may include, for example, one or more of a camera, an optical sensor, a microphone, a gyroscope, an accelerometer, a shock sensor, a position sensor, a light sensor such as an ambient light sensor, a temperature sensor, a touch sensor, a conductivity sensor, and/or a haptic sensor. In some embodiments and, optionally, in combination of any embodiment described above or below, at least one environmental condition may be one of: temperature, humidity, vibration, shock, sound, light, presence of air contaminant, acceleration, pH, location, presence of at least one odor, presence of at least one gas (e.g., volatile organic compounds (VOC), nitrogen, ozone, $CO_2$), air pressure, heartbeat sensor, infrared camera, and maybe a humidity sensor and any combination thereof. For example, the gas sensors may measure one or more of ethylene, ammonia, acetylene, nitrogen, carbon dioxide, oxygen. In some embodiments, sensor 250 may communicate various sensory data as one or more of the eligibility inputs provided to a recommendation engine of the system of provisioning post-interaction data. More details are described with connection to FIG. 3B, below.

Sensors 250 may also include one or more buttons, switches, other tactile input mechanisms, or other forms of user-derived input for receiving an indication or instruction from a card user. In some embodiments, such input devices may receive a sequence or series of inputs, to cause processor 210 to perform various functions associated with the disclosed embodiments.

The smart transaction card may, optionally, also include a display, which may comprise a screen, indicator light, or other appropriate device for displaying a status or message to the user. In some embodiments, display may include a small LCD screen, e-ink screen, or OLED display or one or more LEDs. In some embodiments, the display may provide notifications, prompts, and/or messages to the user.

In some embodiments, smart transaction card 110 may include communication circuitry/devices 255 such as antennae and/or NFC (near-field communication) circuitry, for transmitting and/or receiving data from one or more external locations. Communication circuitry 255 may comprise a short-range wireless transceiver, or a near-field communication (NFC) chip. Communication circuitry 255 may be configured to communicate with mobile device 160, a contactless card reader associated with the computing terminal 195, other systems, and/or other sensors configured to detect the presence of smart transaction card 110. In other embodiments, communication circuitry/devices 255 may comprise Bluetooth circuitry for processing Bluetooth communications. In one example, the Bluetooth circuitry may comprise at least one Bluetooth antenna configured for Bluetooth low energy (BLE) communication. In another example, communication circuitry/devices 255 may comprise RFID communication circuitry. According to various embodiments, wireless access to user data on the card 110 is disabled until the card 110 is activated by verifying that, for example, the one or more detected fingerprints are valid, the one or more external entities are valid, and the like.

In some embodiments, the smart transaction card 110 may include at least one magnetic stripe 280 or other magnetic communication medium that may share or read magnetically-stored information. In some embodiments, magnetic stripe 280 may be controlled by processor 210. For example, processor 210 may write, clear, and rewrite magnetic stripe 280, to provide particular account information.

In various embodiments, empowered with various hardware, firmware, and software components to enable payment transactions and/or communications, exemplary smart transaction card may include a Presto card, a smart chip card, a dynamic transaction card, a conventional EMV card, and the like. As used herein, a smart transaction card refers to the collection of transaction card 110 that have any sort of additional and/or enhanced computation, processing, and communication capabilities compared to a conventional EMV type of transaction card.

Figure 3A:
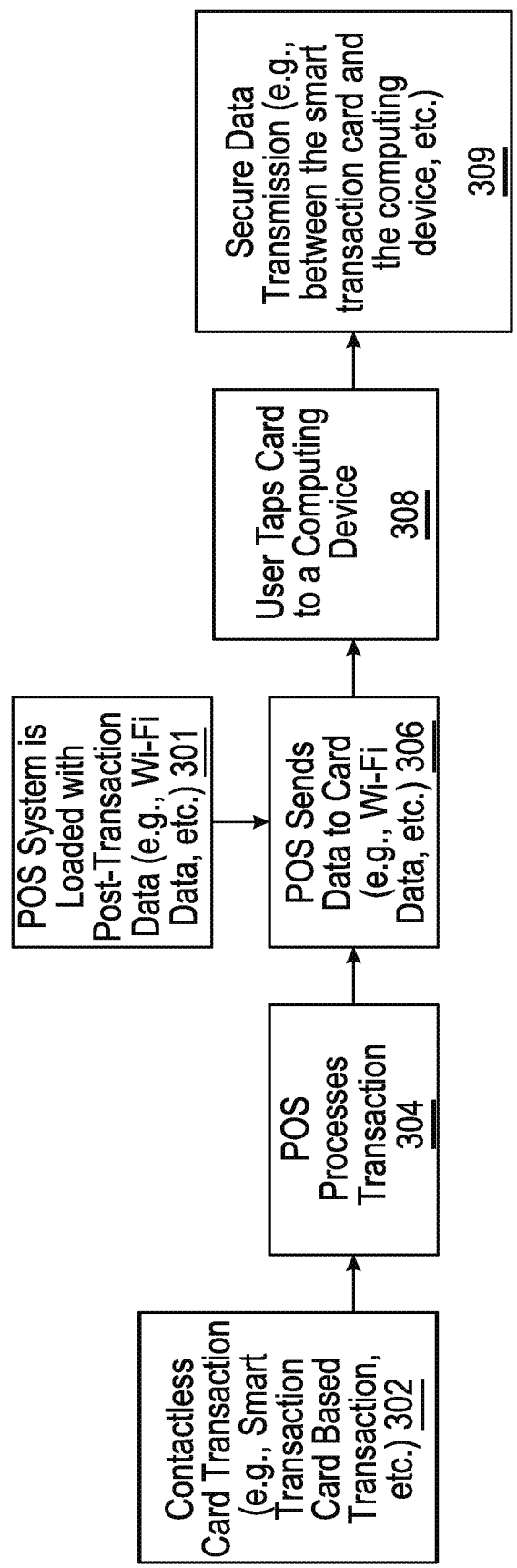
FIG. 3A is a diagram depicting exemplary interactions related to providing post-interaction data associated with smart transaction card based payment transactions, in accordance with certain embodiments of the present disclosure.

FIG. 3A is a flow diagram illustrating an exemplary process 300 related to provisioning post-interaction data to mobile devices via a smart transaction card, consistent with exemplary aspects of at least some embodiments of the present disclosure. As shown in FIG. 3A, the process to provision post-interaction data to a user's mobile device may be initiated at 302 by an event such as a payment request made by a smart transaction card of the user at a computing terminal such as a POS device. Here, in this example, the smart transaction card may be a chip card (e.g., presto card, etc.). Upon receiving the payment transaction request, the computing terminal may, at 304, in addition to processing the payment request according to the information included in the payment transaction request, determine contextual information associated with the particular payment transaction. For instance, the computing terminal may determine the user context information for the user of the smart transaction card based on the information included in the payment request (e.g., the user's demographic information, purchasing activities in general, purchasing activities around the physical location pertaining to the transaction, user's online activities, etc.). Further, the computing terminal may additionally determine the location context information for the physical location pertaining to the transaction based on the information included in the payment request. In one example, the physical location may be a physical store of the merchant operating the computing terminal, a neighborhood of the physical store of the merchant operating the computing terminal, a geo-fenced area of the physical store of the merchant operating the computing terminal, and the like.

In this illustrated example, based on, at least, in part, the user context information and/or location context information, the computing terminal may determine the post-interaction data and obtain such determined post-interaction data. In some embodiments, the computing terminal may load/generate the post-interaction data at 306 locally from other sources such as a database, a server, a cloud based service over the network. In some embodiments, when not configured with sufficient computation resources to retrieve and store the post-interaction data locally, the computing terminal may instead obtain metadata associated with the post-interaction data for loading locally. Such metadata may include, for example, sources (e.g., hyperlinks) to the post-interaction data. In some embodiments, the computing terminal may also generate and/or load a security token configured with the information of the post-interaction data. Such a security token may be utilized to authorize the user at the mobile device to download a crowdsourcing application to crowdsource the post-interaction data. In some embodiments, the computing terminal itself may crowdsource the post-interaction data from one or more electronic resources having similar post-interaction data provisioned for other users.

At 308, the computing terminal transmits the loaded post-interaction data (or the meta data type of post-interaction data, the crowdsourcing token) to the smart transaction card. In turn, the user interacts (e.g., taps) the smart transaction card with the mobile device at 309 to transfer the post-interaction data (or the meta data type of post-interaction data, the crowdsourcing token, etc.) to the mobile device. In one example, the post-interaction data is a Wi-Fi code for the physical location, and such a Wi-Fi code is transmitted to the mobile device such that it is directly applied to the network settings to connect the mobile device to the physical store's wireless network, without displaying the Wi-Fi code to the user. In other embodiments, the Wi-Fi code may be transferred to an post-interaction data application such as the PDC application 107 above-described in connection to FIG. 1, the post-interaction data application configured to recognize the post-interaction data as a Wi-Fi code (or any other types of data), and in turn to communicate the Wi-Fi code to the network settings of the mobile phone, without displaying the information to the user.

Figure 3B:
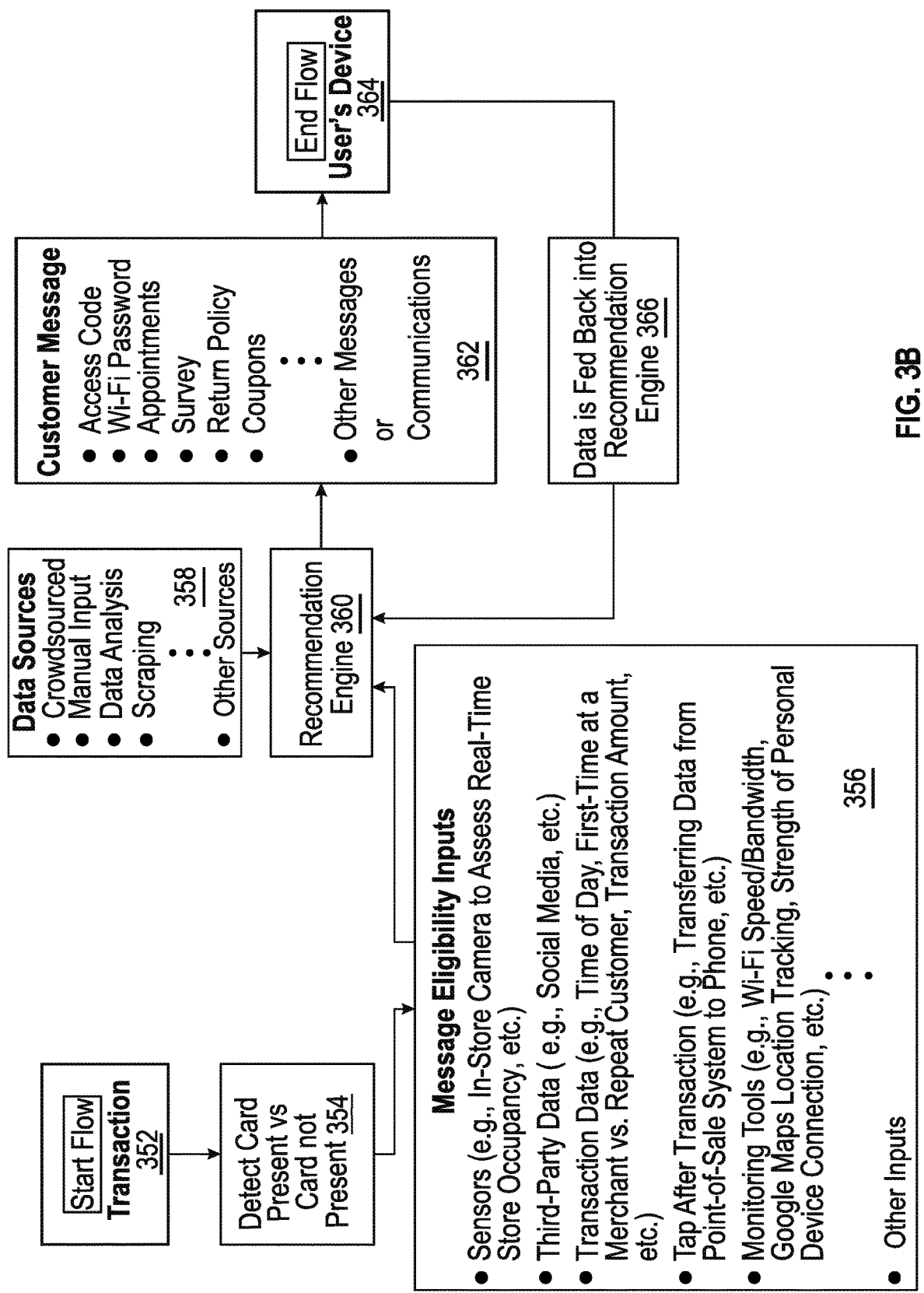
FIG. 3B is a diagram depicting exemplary components, features and interactions related to providing post-interaction data associated with payment transactions, in accordance with certain embodiments of the present disclosure.

FIG. 3B is a flow diagram illustrating an exemplary process 350 related to provisioning post-interaction data to mobile devices, consistent with exemplary aspects of at least some embodiments of the present disclosure. Referring to FIG. 3B, the process 350 starts at 352, where a smart transaction card is used to initiate a payment request at a computing terminal (e.g., a POS device, etc.). In this illustrated example, first, it is determined, at 354, whether the requested transaction is a card-present transaction or card-absent transaction. For instance, it is determined that the payment request initiates a card-present transaction when a smart transaction card (or any type of transaction card) is detected to be present at a point of sale device, the computing device associated with the user is detected to be present at the point of sale device and/or the physical location, or the transaction is fulfilled by the user visiting the physical location. Such detection may be implemented using any suitable techniques such as Bluetooth based proximity detection, proximity sensor based presence detection, GPS enabled location based presence detection, and the like. Such detection may be implemented using machine learning techniques. In this example, the process 350 proceeds to the next stage when it is determined that the transaction is a card-present transaction. some embodiments, when the user makes an online payment using the smart transaction card, the online system may nevertheless transmit the post-interaction data to a computing device associated with the user (e.g., a PC, a laptop, a mobile device, etc.).

In some embodiments, implementations may further determine, at 356, whether the transaction is eligible for provisioning any post-interaction data to the mobile device of the user. In some embodiments, such eligibility is determined by transmitting the post-interaction data in the format of messages, or the like. Various factors and contexts may be taken into account to assess the eligibility associated with the transaction. As illustrated here and by ways of non-limiting examples, the criteria may include one or more of environmental contexts such as: sensor data collected at a physical location pertaining to the transaction (e.g., an in-store camera to detect to what extent the facility is at with regard to occupancy at real time or near real time), monitoring information collected around the physical location (e.g., how strong is the Wi-Fi signal and bandwidth given the number of customer present, the strength of the customers' computing devices, tracked locations of the customers via Google map, or the like), sensor data collected from the one or more sensors 250 of the smart transaction card, etc. The criteria may include one or more of user-related contexts such as third-party information about the user (e.g., social media information about the user). The criteria may include one or more of transaction-related contexts such as the transaction amount, whether the user is a first time customer or a repeated customer, and the like. The criteria may include an indicator that a smart transaction card is used to initiate the transaction request. Here, at this stage, based on those exemplary criteria, it is determined whether or not the request is to be forwarded to a recommendation engine 360 for processing to determine the post-interaction data for provision. If it is determined that the particular transaction is not eligible for provisioning any post-interaction data, the process 350 concludes with processing the payment transaction only. Such ineligibility may be based on the conditions of the environment (e.g., the store is over-crowded, the Wi-Fi system is down, etc.) or the conditions associated with the user and/or transaction (e.g., the user has returned products too many time in the past, the transaction amount is not over a threshold amount, etc.).

When it is determined that the particular transaction is eligible for provisioning post-interaction data, the determination and the criteria based are transmitted to the recommendation engine 360 for further processing. In some embodiments, the recommendation engine 360 may apply a trained machine learning model to recommend post-interaction data for provisioning for the particular transaction. In addition to the data forwarded from stage 256, the recommendation engine 360 may further determine other contexts as input to the machine learning model. In some embodiments, the recommendation engine 360 may further determine context information about the physical location. In one example, such context information may be determined based on sensory data from at least one sensor at the physical location, a status of a computing infrastructure at the physical location, time information, temperature information, holiday information, event information, local regulation information, traffic information, data collected from the smart transaction card and/or user's mobile device, or any combination thereof. The recommendation engine 360 may further determine context information about the user. In one example, such context information may be determined based on at least one of: generally historical purchasing activities, historical purchasing activities around the physical location; historical purchasing activities using the payment information, user calendar schedules, user insurance information, user social media information, user location information, user online activities, user commercial persona information, or any combination thereof.

As illustrated in this example, the recommendation engine 360 may access data sources 358 for supplies of post-interaction data for provisioning. Such data sources may include, for example, a crowdsourcing server, manual input of data, data analyzed by a third-party, searched data over the web, directories, social networks, and the like. Data sources 358 may also include merchant's specific information and programs that are pre-configured in association with the contexts detected with regard to the transaction.

The machine learning model, trained to establish recommendation rules with respect to the input contextual information about the transaction, the user, and the environment, is utilized to output the recommended post-interaction data. In some embodiments, in the training phase, the machine learning model may be trained with a training data set including pairs of a set of contexts of one or more items of contextual information and a set of recommended post-interaction data sourced from the data source 358. In some implementations, the interaction and accessing activity of the user with regard to the post-interaction data provisioned to the user's mobile device may be monitored and collected as feedback data to re-train (at 366) the machine learning model. According to these embodiments, the machine learning model may develop a more accurate prediction with regard to the correlation between the input contexts and the post-interaction data for recommendation. In various embodiments, such a machine learning model may include any suitable algorithms, machine learning networks, other forms of artificial intelligence, without limitation.

In FIG. 3B, exemplary customized post-interaction data items are illustrated, at 362. Here, for example, the recommended post-interaction data items may include an access or facility code (e.g., bathroom code, gym access code, etc.), a Wi-Fi code, a coupon, a receipt, a survey, an appointment reservation, a return policy, and the like. The recommended post-interaction data may also include, not shown herein, programs such as an on-site navigation map, an on-site service reservation program, an on-site inter-merchant offering program, a reminder, or any combination thereof. In some embodiments, the post-interaction data items include a post-interaction program customized for at least one service available in a vicinity of the physical location, and/or a data item pertaining to at least one other merchant that is located in a vicinity of the physical location.

According to some embodiments, the recommended post-interaction data is transmitted to the mobile device of the user, at 364. In this example, the post-interaction data is also displayed to the user via corresponding applications executing on the mobile device of the user (e.g., messaging application, PDC application etc.). Such transmission may be implemented via a first transfer to the smart transaction card of the user, and a subsequent transfer from the smart transaction card to the mobile device of the user. In other embodiments, when the computing terminal determines that the recommended post-interaction data is not available for provisioning, a crowdsourcing token may be transferred instead to the mobile device to trigger it to download (or launch) the crowdsourcing application to obtain the recommended post-interaction data, authorized by the token.

Figure 4A:
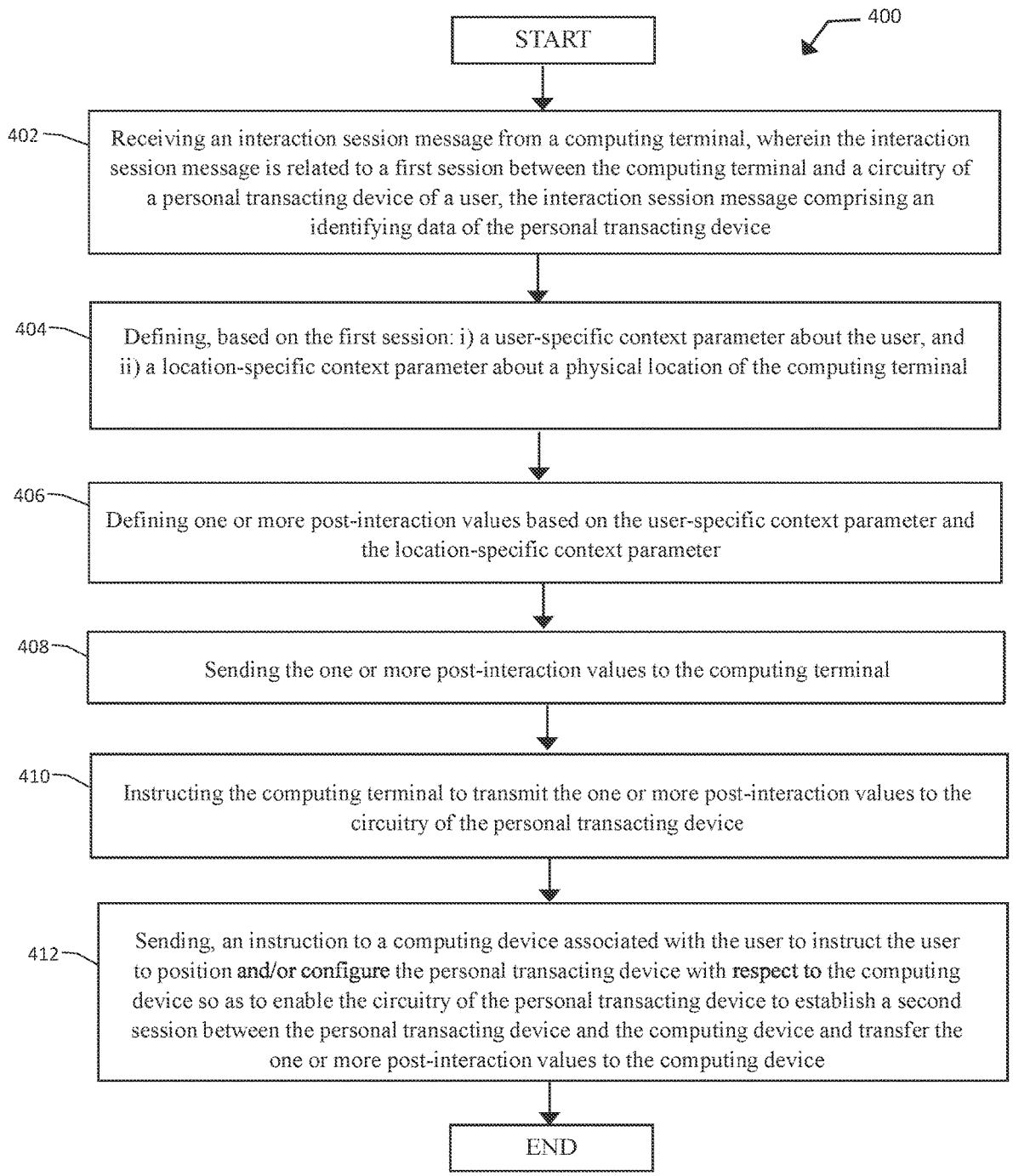
FIG. 4A is a flowchart illustrating an exemplary process related to providing post-interaction data and/or other features associated with a personal transacting device, consistent with exemplary aspects of certain embodiments of the present disclosure.

FIG. 4A is a flow diagram illustrating an exemplary process 400 related to provisioning post-interaction data to a personal transaction device, consistent with exemplary aspects of at least some embodiments of the present disclosure. Referring to FIG. 4A, the illustrative post-interaction data provisioning process 400 may comprise: receiving an interaction session message from a computing terminal, wherein the interaction session message is related to a first session between the computing terminal and a circuitry of a personal transacting device of a user, the interaction session message comprising an identifying data of the personal transacting device, at 402; defining, based on the first session: i) a user-specific context parameter about the user, and ii) a location-specific context parameter about a physical location of the computing terminal, at 404; defining one or more post-interaction values based on the user-specific context parameter and the location-specific context parameter, at 406; sending the one or more post-interaction values to the computing terminal, at 408; instructing the computing terminal to transmit the one or more post-interaction values to the circuitry of the personal transacting device, at 410; and sending, an instruction to a computing device associated with the user to instruct the user to position and/or configure the personal transacting device with respect to the computing device so as to enable the circuitry of the personal transacting device to establish a second session between the personal transacting device and the computing device and transfer the one or more post-interaction values to the computing device, at 412. In other embodiments, the post-interaction data provisioning process 400 may be carried out, in whole or in part, in conjunction with a server, a transacting device, and/or a mobile device that is connected via one or more networks to the server, which is executing instructions for performing one or more steps or aspects of various embodiments described herein.

In some embodiments, post-interaction data provisioning process 400 may include, at 402, a step of receiving an interaction session message from a computing terminal, wherein the interaction session message is related to a first session between the computing terminal and a circuitry of a personal transacting device of a user, the interaction session message comprising an identifying data of the personal transacting device. With regard to the disclosed innovation, the interaction session message may be received via a server, such as a processor of a computer platform, or an online computer platform. In some embodiments, the processor is associated with an entity that issues the smart transaction card to the user. Here, for example, the at least one computer platform may comprise a financial service provider (FSP) system. This FSP system may comprise one or more servers and/or processors associated with a financial service entity that provides, maintains, manages, or otherwise offers financial services. Such financial service entity may include a bank, credit card issuer, or any other type of financial service entity that generates, provides, manages, and/or maintains financial service accounts for one or more customers. In some embodiments, the payment request may be initiated by the smart transaction card itself of the user associated with the computing device. In some embodiments, the interaction session message may comprise a payment transaction. In some embodiments, the personal transacting device of the user may comprise a smart transaction card.

The post-interaction data provisioning process 400 may include, at 404, a step of defining, based on the first session: i) a user-specific context parameter about the user, and ii) a location-specific context parameter about a physical location of the computing terminal. According to some embodiments, the context parameter about a physical location may be determined based at least in part on one or more of: sensory data from at least one sensor at physical locations, a status of a computing infrastructure at physical locations, time information, temperature information, weather information, holiday information, event information, local regulation information, traffic information, or any combination thereof. In such embodiments, the time information may include conditions such as a time of the day, week, month, and/or year. Further, the temperature information and weather may include conditions that are local or at other specific locations. For instance, the temperature and weather information may indicate a local condition as cloudy but a snowy condition at a place nearby. The holiday information may include federal holidays, state designated holidays, national holidays, and/or foreign national holidays. The event information may include events scheduled as upcoming and in the past around the physical location. The sensory data from at least one sensor at physical locations may include conditions such as how occupied the physical location at which the transaction is initiated, or a similar condition with regard to physical locations nearby (e.g., how occupied the other merchants' stores are). The status of a computing infrastructure at physical locations may include conditions for a server capacity, Wi-Fi capacity and bandwidth, for both the physical location and the locations nearby. The local regulation information may include any current and enforceable rules or regulations at the federal level, state level, or local level, and the like. The traffic information may include traffic conditions obtained from traffic websites, traffic radio, proprietary map applications or programs, and the like, around the physical location.

In some embodiments, the context parameter about the user may be determined based on at least in part on one or more of: historical purchasing activities around the physical location; historical purchasing activities using the payment information, user calendar schedules, user insurance information, user credit information, user social media information, user location information, user online activities, user commercial persona information, or any combination thereof. The user online activities may include the websites the user frequents, bookmarks, shops, streams movies or TV series, the applications (apps) the user interacts with, and the like. The user commercial persona information may include information indicating whether the user is an expert consumer in terms of sports supplements, ski gears, etc., or a novice consumer in terms of gardening and home improvement, and the like. Implementations herein may be configured such that the user contextual information may be procured based on the use of the smart transaction card, other transaction card, and/or the mobile device or other computing device of the user. Other implementations may be configured such that the user contextual information may be any such information obtained or otherwise determined for the user, without connection to the smart transaction card and/or computing device of the user.

The post-interaction data provisioning process 400 may include, at 406, a step of defining one or more post-interaction values based on the user-specific context parameter and the location-specific context parameter. Embodiments herein may be configured to determine one or more post-interaction values, such as by use of a machine learning model. Here, for example, implementations may be configured to provide the context parameter about the user and the context parameter about the physical location to a recommendation engine, the recommendation engine trained with a machine learning model to output the one or more post-interaction values. Embodiments herein may also be configured to determine one or more post-interaction values such as by, automatically accessing a plurality of electronic resources having similar post-interaction data items provisioned to other users to obtain the one or more post-interaction data items. In implementations, the electronic resources may include a crowdsourcing server, and/or a peer mobile device partaking the crowdsourcing.

In various embodiments, the post-interaction data items may include any types of data items such as information, programs, sources to the information and programs, a token for crowdsourcing the information and/or programs, and the like. By ways of non-limiting example, the one or more post-interaction data items may include at least one of: a Wi-Fi code, a facility access code, a coupon, a receipt, a return-reminder, a warranty recorder, a follow-up appointment program, a recommendation program, a follow-up survey, or any combination thereof. In one example, the one or more post-interaction data items include a post-interaction program customized for at least one service available in the vicinity of the physical location. In another example, the post-interaction program includes at least one of: an on-site navigation map, an on-site service reservation program, an on-site inter-merchant offering program, or any combination thereof. In yet another example, the one or more post-interaction data items comprise a data item pertaining to at least one other merchant that is located in the vicinity of the physical location.

In some embodiments, when it is determined that one or more of the post-interaction data item are not available for provisioning to the mobile device, an incentive offer may be transmitted to respective computing devices of the other users so as to obtain the one or more post-interaction data items from a computing device associated with at least one other user. In implementations, such other user's computing device has been provisioned with the post-interaction data.

The post-interaction data provisioning process 400 may include, at 408, a step of sending the one or more post-interaction values to the computing terminal. In some embodiments, sending the one or more post-interaction data items may be configured based on at least one of: a timing factor, a frequency factor, a location factor, a regulation factor, an order factor, or any combination thereof. A variety of non-limiting examples of such features and functionality are described hereafter. In one example, a hair-cut appointment reminder/reservation program is pushed to the mobile device after a period of time (e.g., every few months, or a personalized amount of time by monitored user's hair growing speed). A return reminder is pushed to the mobile device not only within the returnable period of time, but also upon detecting that no return has been performed. A user dines at a sushi restaurant may receive, at the mobile device, upon payment for the dinner after the meal, a notification that a nearby cinema is showing a movie the user reads several reviews about online, and the occupancy is currently below the mandated percentage. In another scenario if the user pays before the meal, the notification may nevertheless get pushed to the mobile device and updates the user with the occupancy condition after a period of time, or upon detecting the user is leaving the restaurant, and the like. When a user visits a doctor's office, an appointment program may be pushed to the user's mobile device with an automatically suggested next visit date, which may be automatically determined depending on the insurance program the user is covered under, the user's prior appointments and/or preferences, and other known data, such as treatment frequency, doctor and/or provider recommendations, and the like. In another example embodiment, when the user shops at a coffee house, a Wi-Fi password may be pushed to the user's mobile device, either in a text or directly to the settings for auto-configuration connectivity onto the coffee house's wireless network. In the same scenario, a facility code (e.g., a bathroom access code) may be pushed onto the user's mobile device as well. According to some other examples, when the user visits a service provider (e.g., auto service shop, etc.), a survey (e.g., pertaining to the goods/services transacted with the service provider facility, pertaining to the community, etc.) may be pushed to the user's mobile device. In the same scenario, a return policy and/or warranty information with regard to the goods/services transacted may be pushed to the user's mobile device. For instance, such a return policy may be configured to remain dormant but launch a return reminder (e.g., a push notification, etc.) sometime after the transaction but prior to the deadline for returns to notify the user of not to miss the return deadline if the user intends to do so. In another example, if the PDC app detects that the user has performed a same or similar transaction with regard to the goods/services, the return reminder may not be provided to the user as the PDC app may have concluded that the user is satisfied with the initially transacted goods/services. Still in the same scenario, a coupon may be pushed to the user's mobile device. Such a coupon may be applied to future purchases of the goods/services transacted, or goods/services similar to or distinct from the goods/services transacted. In some examples, the PDC app may procure additional coupons for the user based on the user's behaviors (e.g., purchasing habits, etc.), trending information, and the like. In one example, such a coupon may also be configured with a reminder to notify the user of its expiration date.

The post-interaction data provisioning process 400 may include, at 410, a step of instructing the computing terminal to transmit the one or more post-interaction values to the circuitry of the personal transacting device; and at 412, a step of sending, an instruction to a computing device associated with the user to instruct the user to position and/or configured the personal transacting device with respect to the computing device so as to enable the circuitry of the personal transacting device to establish a second session between the personal transacting device and the computing device and transfer the one or more post-interaction values to the computing device. For example, step 412 may comprise transmitting a notification to the computing device associated with the user to instruct the user to position the personal transacting device in a particular arrangement with the computing device so as to allow the personal transacting device to transfer the one or more post-interaction data items to the computing device. In some embodiments, the personal transacting device is tapped at the mobile device to transfer the post-interaction data. The details of the interaction between the personal transacting device, the computing terminal, and the mobile devices are substantially similar to those above-described and are not repeated herein.

According to some embodiments, the personal transacting device and the computing device are configured so as to allow the personal transacting device to transfer the one or more post-interaction data items to an application executing on the computing device without the one or more post-interaction data items being displayed to the user.

Figure 4B:
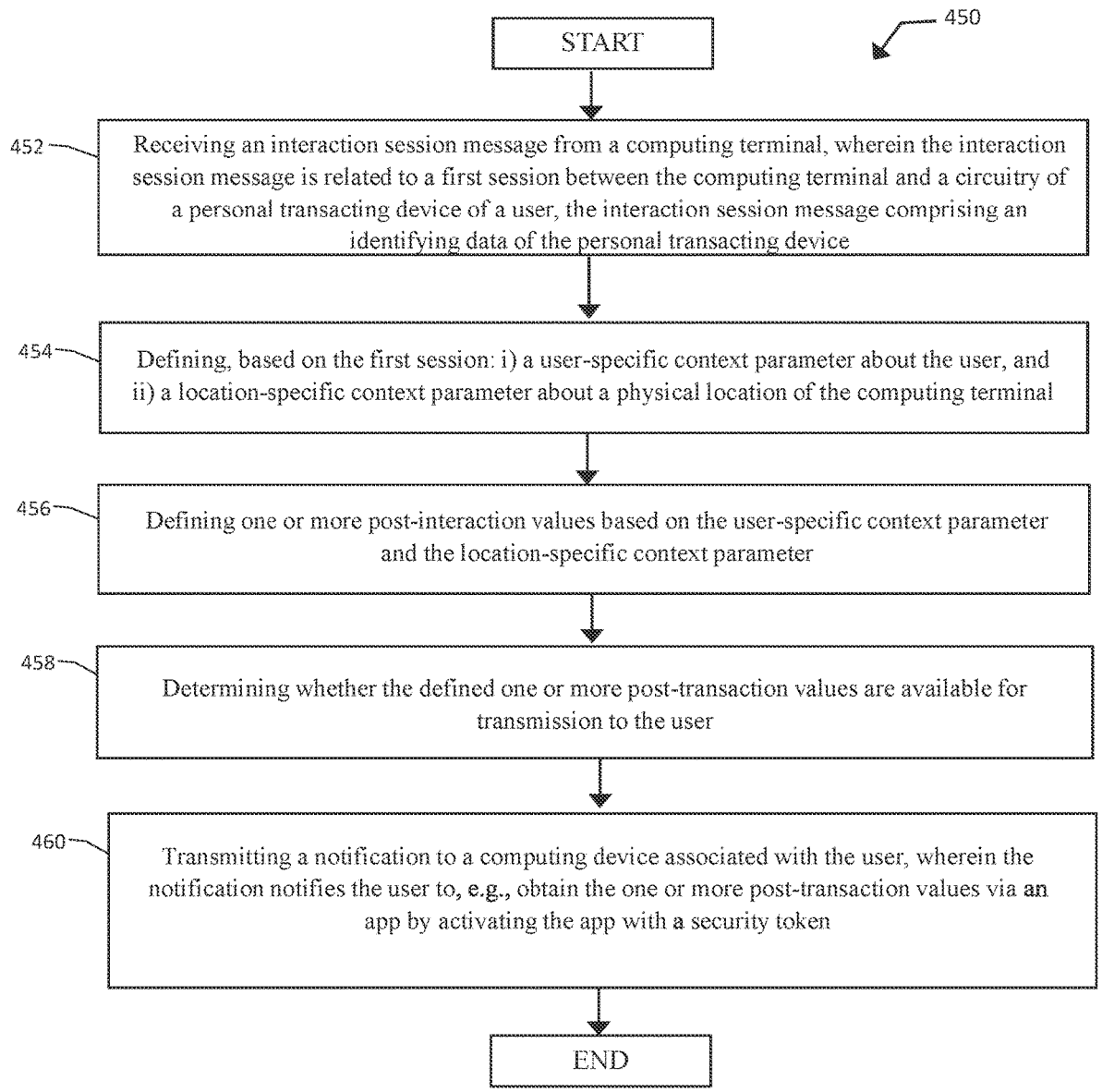
FIG. 4B is a flowchart illustrating another exemplary process related to providing post-interaction data and/or other features associated with payment transactions, consistent with exemplary aspects of certain embodiments of the present disclosure.

FIG. 4B is a flow diagram illustrating another exemplary process 450 related to provisioning post-interaction data to mobile devices, consistent with exemplary aspects of at least some embodiments of the present disclosure. Referring to FIG. 4B, the illustrative post-interaction data provisioning process 450 may comprise: receiving an interaction session message from a computing terminal, wherein the interaction session message is related to a first session between the computing terminal and a circuitry of a personal transacting device of a user, the interaction session message comprising an identifying data of the personal transacting device, at 452; defining, based on the first session: i) a user-specific context parameter about the user, and ii) a location-specific context parameter about a physical location of the computing terminal, at 454; defining one or more post-interaction values based on the user-specific context parameter and the location-specific context parameter, at 456; determining whether the defined one or more post-interaction values are available for transmission to the user, at 458; and transmitting a notification to a computing device associated with the user, wherein the notification notifies the user to, e.g., obtain the one or more post-interaction values via an app by activating the app with a security token, at 460. In some embodiments, the app may comprise a crowdsourcing app. In some embodiments, the notification may include a crowdsourcing app and a security token. In some embodiments, the notification may include a security token and an address for the user to download the crowdsourcing app, instead of the app itself.

In some embodiments, the circuitry of the personal transacting device is configured to store location information corresponding to transactions initiated by the personal transacting device, the location information being utilized by crowdsourcing apps executing on computing devices associated with other users to identify one or more similar post-interaction data items.

In other embodiments, the post-interaction data provisioning process 450 may be carried out, in whole or in part, in conjunction with a server, a computing terminal, and/or a mobile device that is connected via one or more networks to the server, which is executing instructions for performing one or more steps or aspects of various embodiments described herein.

Aspects of the disclosed post-interaction data provisioning mechanisms also yield more efficient and otherwise improved utilization of both processing and communication resources, such as via determining contextual information associated with a transaction, using a machine learning model to recommend customized and contextually cued post-interaction data, and enabling crowdsourcing leveraging the previously provisioned post-interaction data available from other users' mobile devices. Moreover, various exemplary embodiments enabled by the disclosed post-interaction provisioning mechanisms may allow for improved security, responsiveness, efficiency, accuracy, and expanded accessibility to post-interaction data enabled by various features of smart transaction cards in connection with wireless devices of the user, in providing post-interaction information and services, and reducing likelihood that owners of mobile devices/transaction cards interested in such data are exposed to information overflow, or frauds such as eavesdropping, thereby increasing security and/or reducing or eliminating the need for unnecessary processing caused by irrelevant/untimely data and/or fraudulent actions otherwise avoided by the present post-interaction provisioning mechanisms.

Figure 5:
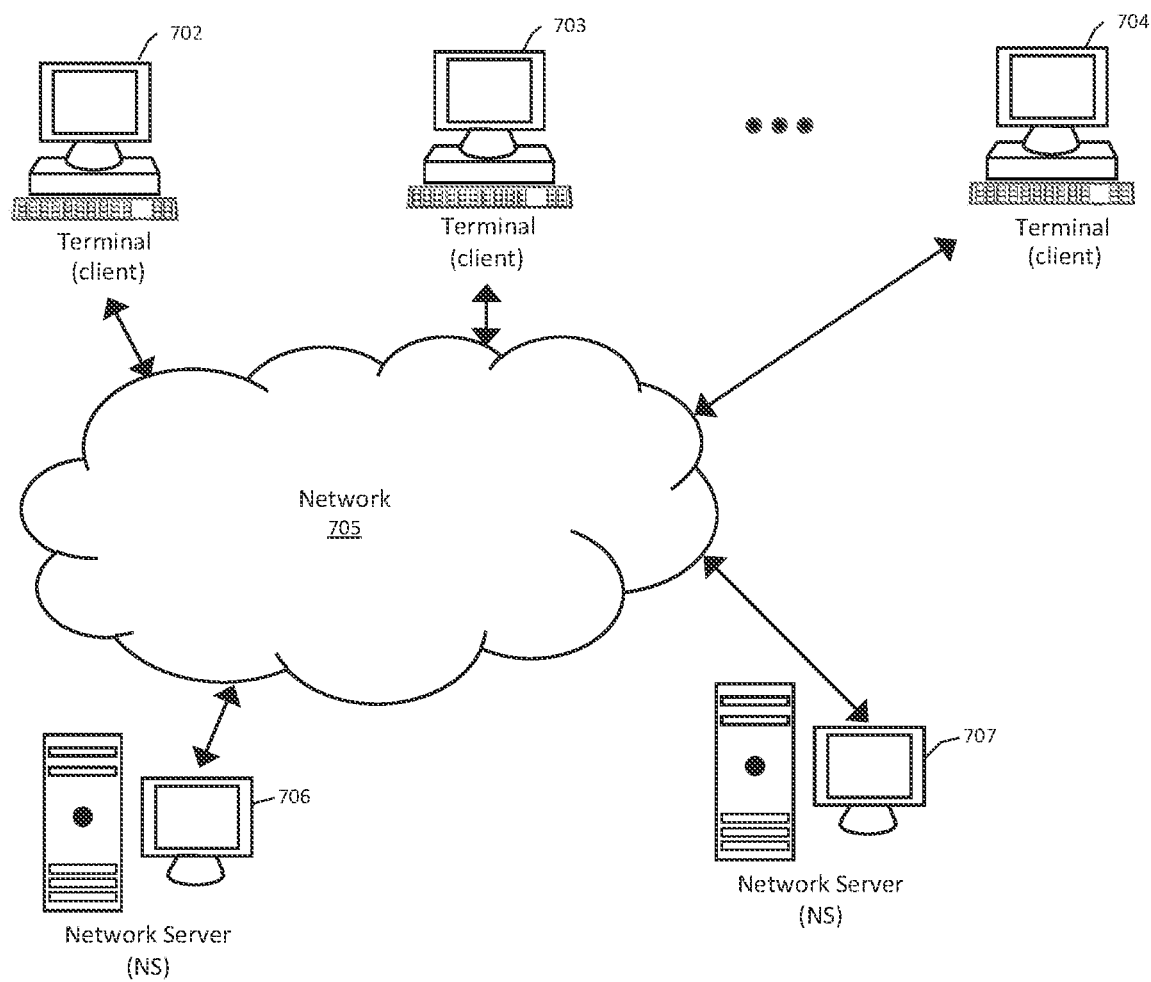
FIG. 5 is a block diagram depicting an exemplary computer-based system and/or platform, in accordance with certain embodiments of the present disclosure.

FIG. 5 depicts a block diagram of an exemplary computer-based system/platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform may be configured to manage a large number of instances of software applications, users, and/or concurrent transactions, as detailed herein. In some embodiments, the exemplary computer-based system/platform may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 5, members 702-704 (e.g., POS devices or clients) of the exemplary computer-based system/platform may include virtually any computing device capable of receiving and sending a message over a network (e.g., cloud network), such as network 705, to and from another computing device, such as servers 706 and 707, each other, and the like. In some embodiments, the member devices 702-704 may be personal computers, multiprocessor systems, microprocessor-based or programmable consumer electronics, network PCs, and the like. In some embodiments, one or more member devices within member devices 702-704 may include computing devices that typically connect using wireless communications media such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 702-704 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 702-704 may include one or more applications, such as Internet browsers, mobile applications, voice calls, video games, videoconferencing, and email, among others. In some embodiments, one or more member devices within member devices 702-704 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 702-704 may be specifically programmed by either Java, .Net, QT, C, C++ and/or other suitable programming language. In some embodiments, one or more member devices within member devices 702-704 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 705 may also include mass storage, such as network attached storage (NAS), a storage area network (SAN), a content delivery network (CDN) or other forms of computer- or machine-readable media.

In some embodiments, the exemplary server 706 or the exemplary server 707 may be a web server (or a series of servers) running a network operating system, examples of which may include but are not limited to Microsoft Windows Server, Novell NetWare, or Linux. In some embodiments, the exemplary server 706 or the exemplary server 707 may be used for and/or provide cloud and/or network computing. Although not shown in FIG. 5, in some embodiments, the exemplary server 706 or the exemplary server 707 may have connections to external systems like email, SMS messaging, text messaging, ad content providers, etc. Any of the features of the exemplary server 706 may be also implemented in the exemplary server 707 and vice versa.

In some embodiments, one or more of the exemplary servers 706 and 707 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 701-704.

In some embodiments and, optionally, in combination of any embodiment described above or below, for example, one or more exemplary computing member devices 702-704, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
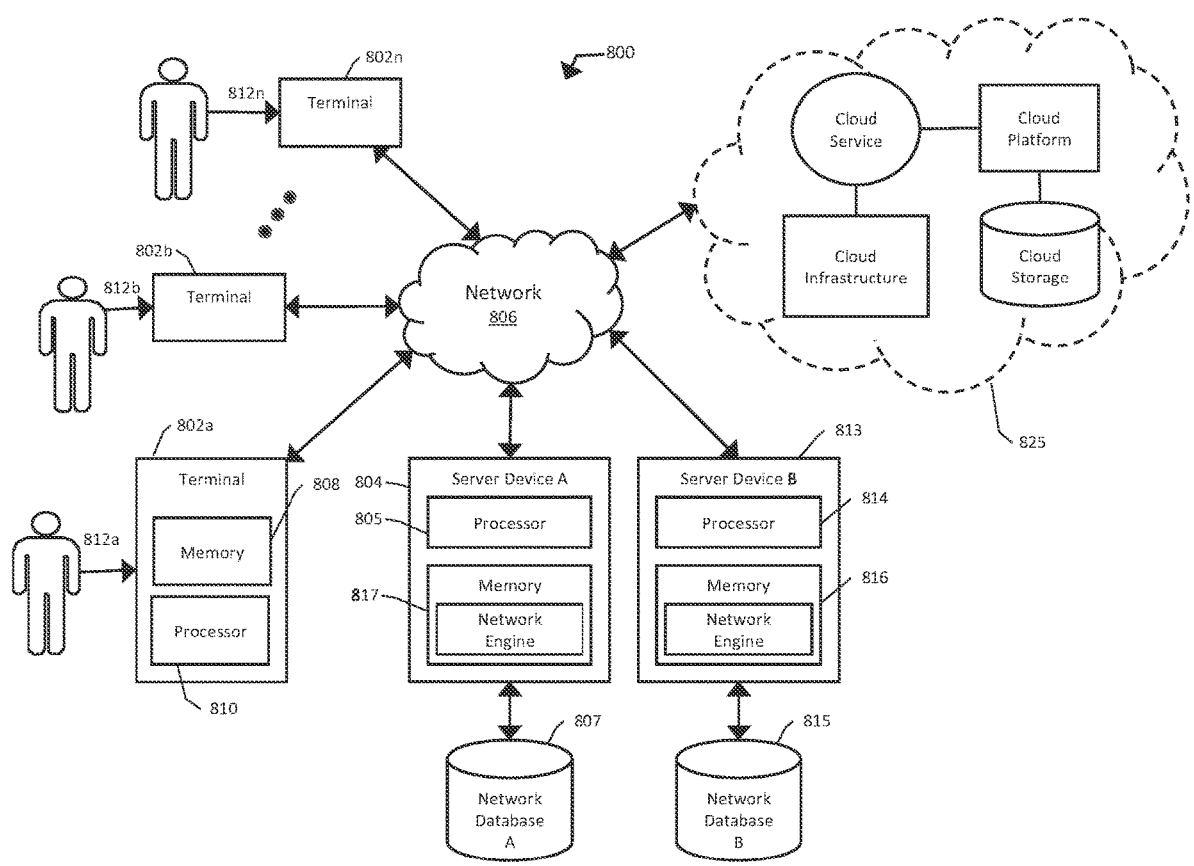
FIG. 6 is a block diagram depicting another exemplary computer-based system and/or platform, in accordance with certain embodiments of the present disclosure.

FIG. 6 depicts a block diagram of another exemplary computer-based system/platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices (e.g., POS devices) 802a, 802b through 802n shown each at least includes computer-readable media, such as a random-access memory (RAM) 808 coupled to a processor 810 and/or memory 808. In some embodiments, the processor 810 may execute computer-executable program instructions stored in memory 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client 802a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other media from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 802a through 802n may also comprise a number of external or internal devices such as a mouse, a CD-ROM, DVD, a physical or virtual keyboard, a display, a speaker, or other input or output devices. In some embodiments, examples of member computing devices 802a through 802n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802a through 802n may be specifically programmed with one or more application programs in accordance with one or more principles/methodologies detailed herein. In some embodiments, member computing devices 802a through 802n may operate on any operating system capable of supporting a browser or browser-enabled application, such as Microsoft™, Windows™, and/or Linux. In some embodiments, member computing devices 802a through 802n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 802a through 802n, users, 812a through 812n, may communicate over the exemplary network 806 with each other and/or with other systems and/or devices coupled to the network 806.

As shown in FIG. 6, exemplary server devices 804 and 813 may be also coupled to the network 806. In some embodiments, one or more member computing devices 802a through 802n may be mobile clients. In some embodiments, server devices 804 and 813 shown each at least includes respective computer-readable media, such as a random-access memory (RAM) coupled to a respective processor 805, 814 and/or respective memory 817, 816. In some embodiments, the processor 805, 814 may execute computer-executable program instructions stored in memory 817, 816, respectively. In some embodiments, the processor 805, 814 may include a microprocessor, an ASIC, and/or a state machine. In some embodiments, the processor 805, 814 may include, or may be in communication with, media, for example computer-readable media, which stores instructions that, when executed by the processor 805, 814, may cause the processor 805, 814 to perform one or more steps described herein. In some embodiments, examples of computer-readable media may include, but are not limited to, an electronic, optical, magnetic, or other storage or transmission device capable of providing a processor, such as the respective processor 805, 814 of server devices 804 and 813, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other media from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, at least one database of exemplary databases 807 and 815 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
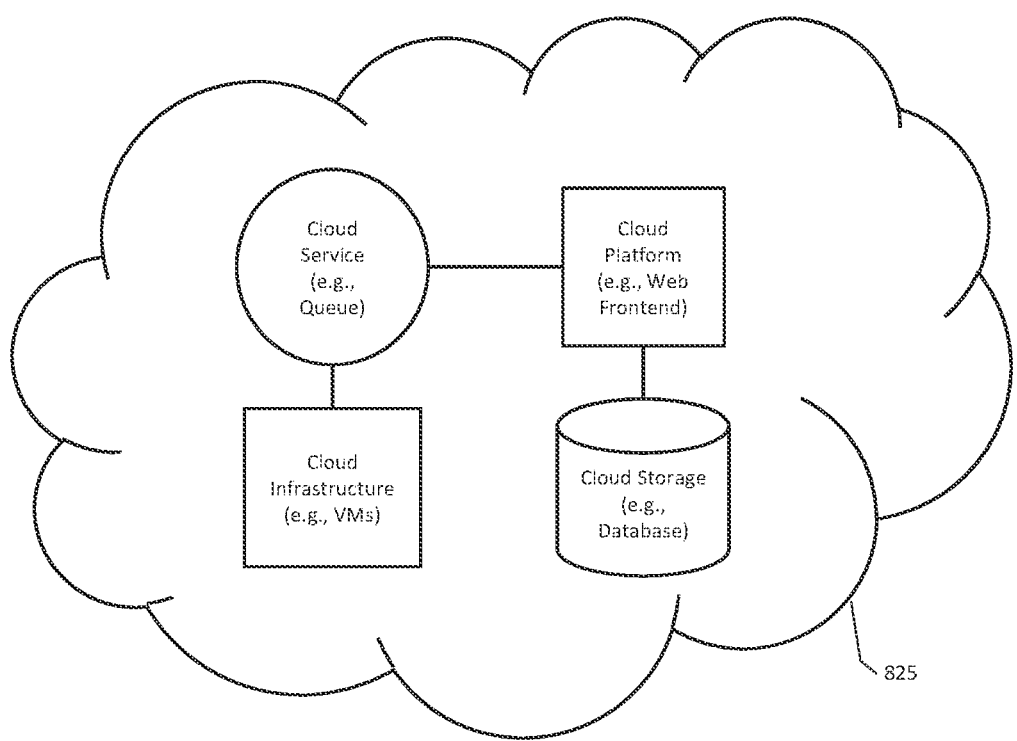
FIGS. 7 and 8 are diagrams illustrating two exemplary implementations of cloud computing architecture/aspects with respect to which the disclosed technology may be specifically configured to operate, in accordance with certain embodiments of the present disclosure.
Figure 8:
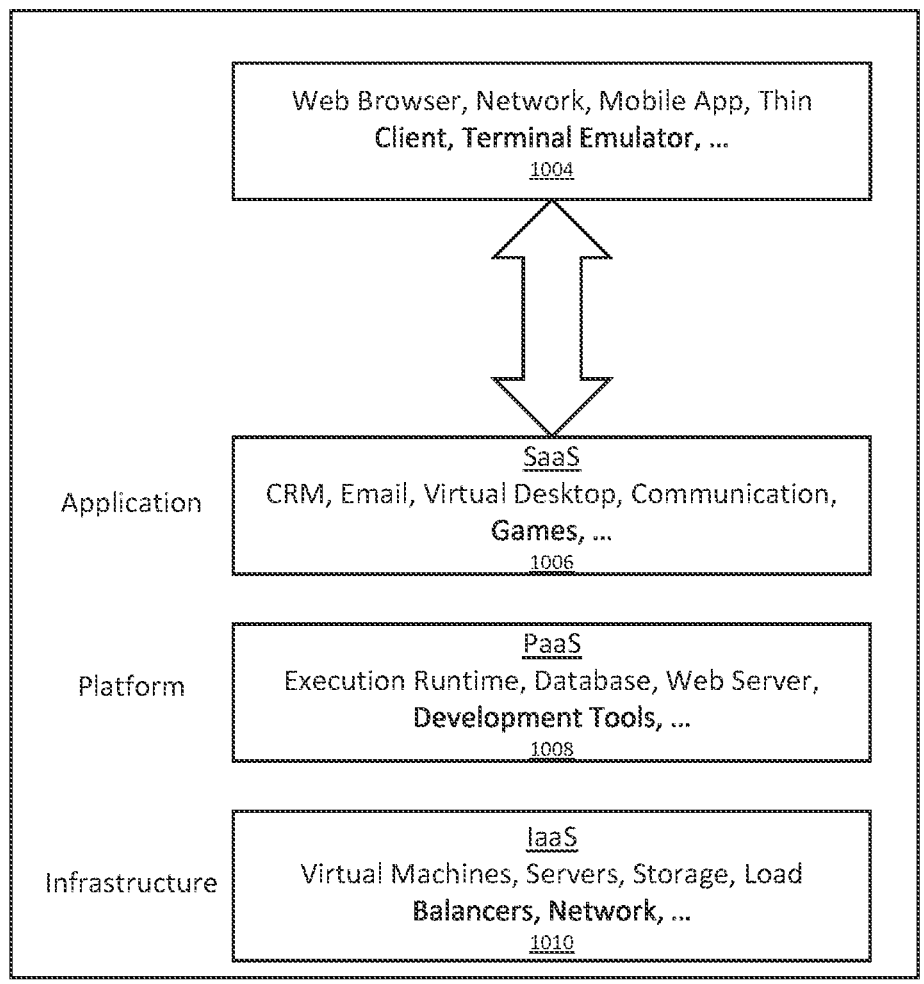

As also shown in FIGS. 7 and 8, some embodiments of the disclosed technology may also include and/or involve one or more cloud components 825, which are shown grouped together in the drawing for sake of illustration, though may be distributed in various ways as known in the art. Cloud components 825 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 8, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 1010, platform as a service (PaaS) 1008, and/or software as a service (SaaS) 1006. FIGS. 7 and 8 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 1006, 1008, 1010 may be utilized in connection with the Web browser and browser extension aspects, shown at 1004, to achieve the innovations herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIGS. 7-8) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) iOS; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A computer-implemented method comprising:
  receiving, by a server, an interaction session message from a computing terminal, wherein the interaction session message is related to a first session between the computing terminal and a circuitry of a personal transacting device of a user, the interaction session message comprising an identifying data of the personal transacting device;
  defining, by the server, based on the first session:
    i) a user-specific context parameter about the user, and
    ii) a location-specific context parameter about a physical location of the computing terminal;
  defining, by the server, one or more post-interaction values based on the user-specific context parameter and the location-specific context parameter;
  sending, by the server, the one or more post-interaction values to the computing terminal;
  instructing, by the server, the computing terminal to transmit the one or more post-interaction values to the circuitry of the personal transacting device; and
  sending, by the server, an instruction to a computing device associated with the user to instruct the user to position the personal transacting device in a specific arrangement with the computing device so as to enable the circuitry of the personal transacting device to establish a second session between the personal transacting device and the computing device and transfer the one or more post-interaction values to the computing device.

Clause 2. The method of clause 1 or any clause herein, wherein the circuitry of the personal transacting device and the computing device are configured so as to allow the circuitry of the personal transacting device to transfer the one or more post-interaction values to an app executing on the computing device without the one or more post-interaction values being displayed to the user.

Clause 3. The method of clause 1 or any clause herein, wherein the defining the one or more post-interaction values comprises:
  providing the user-specific context parameter about the user and the location-specific context parameter about the physical location of the computing terminal to a recommendation engine, the recommendation engine trained with a machine learning model to output the one or more post-interaction values.

Clause 4. The method of clause 1 or any clause herein, in the defining the one or more post-interaction values further comprises:
  automatically accessing a plurality of electronic resources having similar post-interaction values provisioned to other users to obtain the one or more post-interaction values.

Clause 5. The method of clause 1 or any clause herein, wherein the defining a location-specific context parameter about a physical location of the computing terminal is based on at least one of: sensory data from at least one sensor at the physical location, a status of a computing infrastructure at the physical location, time information, temperature information, holiday information, event information, local regulation information, traffic information, or any combination thereof.

Clause 6. The method of clause 1 or any clause herein, wherein the defining a user-specific context parameter about the user is based on at least one of: historical purchasing activities around the physical location; historical purchasing activities associated with the personal transacting device, user calendar schedules, user insurance information, user social media information, user location information, user online activities, user commercial persona information, or any combination thereof.

Clause 7. The method of clause 1 or any clause herein, wherein the one or more post-interaction values include at least one of: a Wi-Fi code, a facility access code, a coupon, a receipt, a return-reminder, a warranty recorder, a follow-up appointment program, a recommendation program, a follow-up survey, or any combination thereof.

Clause 8. The method of clause 1 or any clause herein, wherein the one or more post-interaction data items includes a post-interaction program customized for at least one service available in a vicinity of the physical location.

Clause 9. The method of clause 1 or any clause herein, wherein the post-interaction program includes at least one of: an on-site navigation map, an on-site service reservation program, an on-site inter-merchant offering program, or any combination thereof.

Clause 10. The method of clause 1 or any clause herein, wherein the instructing the computing terminal to transmit the one or more post-interaction values to the circuitry of the personal transacting device is configured based on at least one of: a timing factor, a frequency factor, a location factor, a regulation factor, an order factor, or any combination thereof.

Clause 11. The method of clause 1 or any clause herein, wherein the one or more post-interaction values comprise a data item pertaining to at least one other merchant that is located in a vicinity of the physical location.

Clause 12. The method of clause 1 or any clause herein, wherein the server is associated with an entity that issues the personal transacting device to the user.

Clause 13. The method of clause 4 or any clause herein, wherein the defining the one or more post-interaction values further comprises:
transmitting an incentive offer to respective computing devices of the other users so as to obtain the one or more post-interaction values from a computing device associated with at least one other user.

Clause 14. The method of clause 1 or any clause herein, further comprising determining whether the interaction session message initiates a card-present transaction by:
determining that the interaction session message initiates a card-present transaction when the personal transacting device is detected to be present at a point of sale device;
determining that the interaction session message initiates a card-present transaction when the computing device associated with the user is detected to be present at the point of sale device; and
determining that the interaction session message initiates a card-present transaction when the transaction is fulfilled by the user visiting the physical location.

Clause 15. The method of claim 1 or any clause herein, wherein the personal transacting device comprises a smart transaction card.

Clause 16. The method of claim 1 or any clause herein, wherein the interaction session message comprises a payment request.

Clause 17. A method comprising:
receiving, by a server, an interaction session message from a computing terminal, wherein the interaction session message is related to a first session between the computing terminal and a circuitry of a personal transacting device of a user, the interaction session message comprising an identifying data of the personal transacting device;
defining, by the server, based on the first session:
  i) a user-specific context parameter about the user, and
  ii) a location-specific context parameter about a physical location of the computing terminal;
defining, by the server, one or more post-interaction values based on the user-specific context parameter and the location-specific context parameter;
determining, by the server, whether the defined one or more post-interaction values are available for transmission to the user; and
transmitting, by the server and responsive to determining that the one or more post-interaction values are not available for transmission to the user, a notification to a computing device associated with the user, wherein the notification includes a crowdsourcing app and a security token, and the notification notifies the user to obtain the one or more post-interaction values via the crowdsourcing app by activating the crowdsourcing app with the security token.

Clause 18. The method of clause 17 or any clause herein, wherein the personal transacting device is configured to store location information corresponding to sessions initiated by the personal transacting device, the location information being utilized by crowdsourcing apps executing on computing devices associated with other users to identify one or more similar post-interaction values.

Clause 19. A system comprising:
one or more processors; and
a memory in communication with the one or more processors and storing instructions that, when executed by the one or more processors, cause the one or more processors to:
  receive an interaction session message from a computing terminal, wherein the interaction session message is related to a first session between the computing terminal and a circuitry of a personal transacting device of a user, the interaction session message comprising an identifying data of the personal transacting device;
  define based on the first session:
    i) a user-specific context parameter about the user, and
    ii) a location-specific context parameter about a physical location of the computing terminal;
  define one or more post-interaction values based on the user-specific context parameter and the location-specific context parameter;
  send the one or more post-interaction values to the computing terminal;

instruct the computing terminal to transmit the one or more post-interaction values to the circuitry of the personal transacting device; and send an instruction to a computing device associated with the user to instruct the user to position the personal transacting device in a specific arrangement with the computing device so as to enable the circuitry of the personal transacting device to establish a second session between the personal transacting device and the computing device and transfer the one or more post-interaction values to the computing device.

Clause 20. The system of clause 19 or any clause herein, wherein the circuitry of the personal transacting device and the computing device associated with the user are configured so as to allow the circuitry of the personal transacting device to transfer the one or more post-interaction values to an app executing on the computing device without the one or more post-interaction values being displayed to the user.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method comprising:
defining, by a server, at least one context parameter associated with an interaction session between a computing terminal and a circuitry of a personal transacting device;
training a machine learning model with a training data set including contextual information and recommended post-interaction data;
providing, by the server, the at least one context parameter to a recommendation engine, the recommendation engine applying the trained machine learning model to output one or more post-interaction values;
sending, by the server, the one or more post-interaction values to the computing terminal;
instructing, by the server, the computing terminal to transmit the one or more post-interaction values to the circuitry of the personal transacting device; and
sending, by the server, an instruction to a computing device to render the personal transacting device to be positioned in a specific arrangement with the computing device so as to enable the circuitry of the personal transacting device to establish a second session between the personal transacting device and the computing device and transfer the one or more post-interaction values to the computing device.

2. The method of claim 1, wherein the circuitry of the personal transacting device and the computing device are configured so as to allow the circuitry of the personal transacting device to transfer the one or more post-interaction values to an app executing on the computing device without the one or more post-interaction values being displayed to a user of the personal transacting device.

3. The method of claim 1, further comprising defining the one or more post-interaction values based on a user-specific context parameter and a location specific context parameter, wherein defining the one or more post-interaction values further comprises:
automatically accessing a plurality of electronic resources having similar post-interaction values provisioned to users other than a user of the personal transacting device to obtain the one or more post-interaction values.

4. The method of claim 1, wherein the defining a location-specific context parameter about a physical location of the computing terminal is based on at least one of:
sensory data from at least one sensor at the physical location, a status of a computing infrastructure at the physical location, time information, temperature information, holiday information, event information, local regulation information, traffic information, or any combination thereof.

5. The method of claim 1, further comprising defining a user-specific context parameter about a user of the personal transacting device based on at least one of: historical purchasing activities around a physical location of the computing terminal; historical purchasing activities associated with the personal transacting device, user calendar schedules, user insurance information, user social media information, user location information, user online activities, user commercial persona information, or any combination thereof.

6. The method of claim 1, wherein the one or more post-interaction values include at least one of: a Wi-Fi code, a facility access code, a coupon, a receipt, a return-reminder, a warranty recorder, a follow-up appointment program, a recommendation program, a follow-up survey, or any combination thereof.

7. The method of claim 1, wherein the one or more post-interaction values include a post-interaction program customized for at least one service available in a vicinity of a physical location of the computing terminal.

8. The method of claim 7, wherein the post-interaction program includes at least one of: an on-site navigation map, an on-site service reservation program, an on-site inter-merchant offering program, or any combination thereof.

9. The method of claim 1, wherein the instructing the computing terminal to transmit the one or more post-interaction values to the circuitry of the personal transacting device is configured based on at least one of: a timing factor, a frequency factor, a location factor, a regulation factor, an order factor, or any combination thereof.

10. The method of claim 1, wherein the one or more post-interaction values comprise a data item pertaining to at least one other merchant that is located in a vicinity of a physical location of the computing terminal.

11. The method of claim 1, wherein the server is associated with an entity that issues the personal transacting device to a user.

12. The method of claim 3, wherein the defining the one or more post-interaction values further comprises:
transmitting an incentive offer to respective computing devices of the other users so as to obtain the one or more post-interaction values from a computing device associated with at least one other user.

13. The method of claim 1, further comprising determining whether a message of the interaction session initiates a card-present transaction by:
determining that the interaction session message initiates a card-present transaction when the personal transacting device is detected to be present at a point of sale device;

determining that the interaction session message initiates a card-present transaction when the computing device associated with a user of the personal transacting device is detected to be present at the point of sale device; and determining that the interaction session message initiates a card-present transaction when the transaction is fulfilled by the user visiting a physical location of the computing terminal.

14. The method of claim 1, wherein the personal transacting device comprises a smart transaction card.

15. The method of claim 1, wherein a message of the interaction session comprises a payment request.

16. A method comprising:
training a machine learning model with a training data set including pairs of a set of context of one or more items of contextual information and a set of recommended post-interaction data sourced from a data source including at least one of a crowdsourcing server, manual input of data, data analyzed by a third-party, searched data over the web, directories, and social networks;
providing a user-specific context parameter about a user of a personal transacting device and a location-specific context parameter about a physical location of a computing terminal to a recommendation engine, the recommendation engine trained with the trained machine learning model to output one or more post-interaction values; and
transmitting, by the server, a notification to a computing device associated with the user.

17. The method of claim 16, wherein the personal transacting device is configured to store location information corresponding to sessions initiated by the personal transacting device, the location information being utilized by crowdsourcing apps executing on computing devices associated with other users to identify one or more similar post-interaction values.

18. A system comprising:
one or more processors; and
a memory in communication with the one or more processors and storing instructions that, when executed by the one or more processors, cause the one or more processors to:
define at least one context parameter associated with an interaction session between a computing terminal and a circuitry of a personal transacting device;
train a machine learning model with a training data set;
provide a context parameter and a location-specific context parameter of the computing terminal to a recommendation engine, the recommendation engine applying the trained machine learning model to output one or more post-interaction values;
send the one or more post-interaction values to the computing terminal;
instruct the computing terminal to transmit the one or more post-interaction values to the circuitry of the personal transacting device; and
send an instruction to a computing device to render the personal transacting device to be positioned in a specific arrangement with the computing device so as to enable the circuitry of the personal transacting device to establish a second session between the personal transacting device and the computing device and transfer the one or more post-interaction values to the computing device.

19. The system of claim 18, wherein the circuitry of the personal transacting device and the computing device are configured so as to allow the circuitry of the personal transacting device to transfer the one or more post-interaction values to an app executing on the computing device without the one or more post-interaction values being displayed to a user of the personal transacting device.